(12) United States Patent
Omi et al.

(10) Patent No.: US 6,767,513 B1
(45) Date of Patent: Jul. 27, 2004

(54) METHOD OF TREATING EXHAUST GASES CONTAINING HALOGEN BASED COMPOUND

(75) Inventors: Tadahiro Omi, Sendai (JP); Yoshitaka Honda, Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/254,186

(22) PCT Filed: Sep. 1, 1997

(86) PCT No.: PCT/JP97/03050

§ 371 (c)(1),
(2), (4) Date: Mar. 2, 1999

(87) PCT Pub. No.: WO98/09715

PCT Pub. Date: Mar. 12, 1998

(30) Foreign Application Priority Data

Apr. 9, 1996 (JP) .............................................. 8/253836

(51) Int. Cl.$^7$ .............................. A61L 9/00; A62B 7/08; C01B 7/00; B01D 53/02
(52) U.S. Cl. ....................... 422/122; 422/4; 423/240 S; 423/241; 95/131; 95/132
(58) Field of Search ............... 422/4, 122; 95/131–132; 423/240 R, 241, 240 S

(56) References Cited

U.S. PATENT DOCUMENTS

| | | | | |
|---|---|---|---|---|
| 4,157,374 A | * | 6/1979 | Carpenter et al. | |
| 4,594,231 A | * | 6/1986 | Nishino et al. | |
| 5,213,767 A | * | 5/1993 | Smith et al. | |
| 5,276,249 A | * | 1/1994 | Greene et al. | .............. 588/206 |
| 5,322,674 A | * | 6/1994 | Mori | |
| 5,380,507 A | * | 1/1995 | Hiltunen et al. | |
| 5,417,948 A | * | 5/1995 | Iwata et al. | .............. 423/239.1 |
| 5,430,230 A | * | 7/1995 | Mitsui et al. | |
| 5,481,063 A | * | 1/1996 | Hiltunen et al. | ............ 588/205 |

FOREIGN PATENT DOCUMENTS

| | | | | |
|---|---|---|---|---|
| JP | 6-134256 | | 5/1994 | |
| JP | 06-296710 | * | 10/1994 | ............ A62D/3/00 |
| JP | 7-171339 | | 7/1995 | |

* cited by examiner

*Primary Examiner*—Robert J. Warden, Sr.
*Assistant Examiner*—Monzer R. Chorbaji
(74) *Attorney, Agent, or Firm*—Armstrong, Kratz, Quintos, Hanson & Brooks, LLP

(57) ABSTRACT

A method of treating exhaust gases containing halogen compound, the improvement in that the exhaust gases containing halogen compounds such as halogen gases and/or hydrogen halide gases (halogenated acid gases) are brought into contact with simple metals.

The halogen compounds such as acid gases and halogen gases can thereby effectively be removed from the exhaust gases.

2 Claims, No Drawings

METHOD OF TREATING EXHAUST GASES CONTAINING HALOGEN BASED COMPOUND

FIELD OF THE INVENTION

The present invention is directed to a method of treating exhaust gases containing halogen compound (halogen or halide), for example, halogen gase and halogenated acid gas such as hydrogen halide, and in particular to a method of removing and detoxifying exhaust gases containing halogen compound discharged from the dry etching process and so on during the manufacture of semiconductors.

PRIOR ART

In the semiconductor industry, many kinds of corrosive gases are used to manufacture semiconductors. They are highly toxic, and can contaminate the environment. The exhaust gases discharged during dry etching containing halogen compound which are detrimental to human bodies. Besides, they are corrosive, causing problems in corroding devices in the vacuum system when combined with any moisture present in the system. Thus, it is a pressing issue to establish a system for removing these gases. Several methods have been suggested to remove these halides, such as those disclosed in patents, Japanese Patent Opening Nos.6-198128, 6-47233, and 4-94723. These patents suggest methods of removing halide gases using the following treatment agents (1) to (5).

(1) Metal oxides (oxides of several metals)
(2) Activated carbon or activated carbon carrying medicines (such as activated carbon carrying alkali metal oxides as adsorbent)
(3) Alkalis ($Ca(OH)_2$, $Mg(OH)_2$, CaO, MgO, etc.)
(4) Oxidizing agents ($KMnO_4$, etc.)
(5) Combination of the above (1) to (4)

Halide gases discharged during dry etching are roughly classified by their natures into the following groups.

(1) Halogen gases ($F_2$, $Cl_2$, $Br_2$)
(2) Hydrogen halide gases (acid gases) (HF, HCl, HBr)
(3) Others Generally, it is rare that a single gas is discharged. Usually, more than one gas is discharged mixed together.

Among these halides, (1) and (2) generate most problems. They should be not only completely treated because they are harmful to human bodies and the environment, but also they are corrosive gases to combine with moisture in the system to corrode equipment (dry pumps, metal components of rotary pumps, and metal plumbings) in the vacuum system.

Corrosion of equipment will reduce the stability of the vacuum system, make it difficult to support the conditions for manufacturing semiconductors, and incur considerable costs in replacing corroded components.

With the conventionally proposed detoxifying (treating) agents such as metal oxides ($Fe_2O_3$ as an example), the metal oxide reacts with an acid gas to generate water as follows:

$$Fe_2O_3 + 6HCl \rightarrow 2FeCl_3 + 3H_2O$$

As stated above, water is detrimental because it causes corrosion in the system. Similarly, alkalis and oxidizing agents are detrimental because they react with an acid gas to generate water. Activated carbon cannot treat the acid gas sufficiently. Therefore, it is necessary to provide the vacuum system with a system that reacts with or adsorbs acid gases and halogens (physical adsorption, reactive adsorption) without generating water. But there is no such system based on the prior arts.

Purpose of the Invention

The purpose of the present invention is to provide a method of effectively removing halogen compounds such as acid gases and halogen gases, as stated above, from exhaust gases.

Constitution of the Invention

The present invention relates to a method of treating exhaust gases containing halogen compounds, the improvement in that simple metals are employed to come into contact with the exhaust gases containing the halogen compounds such as halogen gases and/or hydrogen halides (halogenated acid gases).

According to the treatment method of the present invention, simple metals are used as agents for treating exhaust gases. These metals react with the halogen compounds as shown in the following formulas, thereby removing corrosive, harmful halides, without generating water, and avoiding corrosion effectively within the system as the following formulas:

$$2Fe + 6HCl \rightarrow 2FeCl_3 + 3H_2$$

$$2Fe + 3Cl_2 \rightarrow 2FeCl_3$$

In the treatment of the present invention, the simple metals include tin, lead, zinc, zirconium, iron, nickel, molybdenum, manganese, tantalum, and cobalt, and at least one of these should be used.

It is advantageous for facilitating reaction to bring exhaust gases containing halogen compounds into contact with such simple metals at 20 to 300° C. (preferably 100 to 300° C.).

The simple metals may be of any shape: granule, bar or sheet, as long as they are operable. The size of metal should preferably be as large as possible to increase the contact area unless ventilation resistance increases when the exhaust gases pass. A single simple metal or more than one simple metal may be used at one time.

Contact between the exhaust gases and the metals is realized by filling the metals according to the gas load in a packed tower and introducing the gases into the tower to bring them into contact with the metals.

The actual points at which the exhaust gases are to be removed during dry etching in the manufacture of semiconductors may be as follows.

a) Between the vacuum pump and the reactor
b) Between the vacuum pump and the exhaust gas outlet
c) If an oil-sealed rotary vacuum pump is used, the pump oil is circulated and passed through the packed tower as above to remove dissolved gas within the vacuum pump oil.

Items a) and c) above are provided to protect the vacuum pump from corrosion, and b) is to avoid discharge of the exhaust gases into the environment.

As a toxicity removing (treating) agent, the above simple metals and activated coal can be combined in use.

Industrial Uses of the Invention

Because the treatment method of the present invention uses simple metals as an agent for treating exhaust gases, the metals react with halogen compounds, for example, as shown in the above formulas, not only removing corrosive and harmful halogen compounds without generating water, but also effectively preventing corrosion from occurring in the system.

Embodiment

Now several examples of the present invention will be described. They will not limit application of the invention.

EXAMPLE 1

A 50 mm diameter SUS packed tower, which can be heated from the outside, was filled with a 10 cm high packed bed of tin (granule, 2 to 3 mm in diameter). At 20° C., halogen compound gases that had been diluted with nitrogen were passed at 1 liter/minute for two hours into the packed tower. (The concentration of each halogen compound gas was 1%.) Then the processed gases at the outlet of the packed tower were analyzed as follows.

When halogens ($F_2$, $Cl_2$, $Br_2$) were used as the halogen compound gases, the entire volume of each outlet gas was bubbled in an aqueous KI solution, generated $I_2$ was titrated using hypo, and the volume of halogen (unprocessed rates) which was not processed was calculated using the following equation. The results are shown in Table 1 below. (Numerals in the table and subsequent tables are unprocessed rates (%).)

When acids (HF, HCl, HBr) were used as the halogen compound gases, the entire volume of each outlet gas was bubbled through aqueous ammonia, neutralized, and then analyzed by ion chromatography to calculate unprocessed acids (unprocessed rates) using the following equation. The results are shown in Table 1.

Unprocessed rate (%)={(unprocessed halogen compound gas)/(flowing halogen compound gas)}×100

The same experiment was duplicated with the packed tower heated to 100° C., 200° C., and 300° C. The results are shown in Table 1 below.

TABLE 1

|     | 20° C. | 100° C. | 200° C. | 300° C. |
|-----|--------|---------|---------|---------|
| $F_2$  | 20     | 3       | <0.1    | —       |
| $Cl_2$ | <0.1   | <0.1    | <0.1    | —       |
| $Br_2$ | <0.1   | <0.1    | <0.1    | —       |
| HF  | 35     | 15      | <0.1    | —       |

(Numerals in the table are unprocessed rates (%).)

The results of this example proved that the present invention removes halogen compound gases effectively. Especially, the fluorine compound gas is effectively removed at higher temperatures.

EXAMPLE 2

The same SUS packed tower as Example 1 was filled with a 10 cm high packed bed of zirconium (sponge, 2 to 5 mm in diameter). The same experiment was conducted with other conditions similarly maintained as in Example 1. The results are shown in Table 2 below.

TABLE 2

|     | 20° C. | 100° C. | 200° C. | 300° C. |
|-----|--------|---------|---------|---------|
| $F_2$ | 80     | 28      | <0.1    | <0.1    |
| HF  | 90     | 38      | 1       | <0.1    |

(Numerals in the table are unprocessed rates (%).)

The results of this example proved that the present invention removes the fluorine compound gases effectively at higher temperatures.

EXAMPLE 3

The same SUS packed tower as Example 1 was filled with a 10 cm high packed bed of lead (granules, 2 to 5 mm in diameter). The same experiment was conducted with other conditions similarly maintained as in Example 1. The results are shown in Table 3 below.

TABLE 3

|     | 20° C. | 200° C. | 300° C. |
|-----|--------|---------|---------|
| $F_2$  | <0.1   | <0.1    | <0.1    |
| $Cl_2$ | —      | 55      | <0.1    |
| HF  | 85     | <0.1    | <0.1    |

(Numerals in the table are unprocessed rates (%).)

The results of this experiment proved that the present invention sufficiently removes fluorine even at not less than 20° C., HF at high temperature, and $Cl_2$ at higher temperature.

EXAMPLE 4

The same SUS packed tower as Example 1 was filled with a 10 cm high packed bed of zinc (granules, 3 to 7 mm in diameter). The same experiment was conducted with other conditions similarly maintained as in Example 1. The results are shown in Table 4 below.

TABLE 4

|     | 20° C. | 100° C. | 200° C. | 300° C. |
|-----|--------|---------|---------|---------|
| $F_2$  | —      | 54      | 24      | <0.1    |
| $Br_2$ | —      | —       | 88      | <0.1    |
| HF  | 88     | 32      | <0.1    | <0.1    |

(Numerals in the table are unprocessed rates (%).)

The results of this experiment proved that the present invention removes the halogen gases at high temperatures, and HF sufficiently even at lower temperatures.

EXAMPLE 5

The same SUS packed tower as Example 1 was filled with 10cm high packed bed of iron (granule, 2 to 3 mm in diameter). The same experiment was conducted with other conditions similarly maintained as in Example 1. The results are shown in Table 5 below.

TABLE 5

|     | 20° C. | 200° C. | 300° C. |
|-----|--------|---------|---------|
| $F_2$  | —      | 23      | <0.1    |
| $Br_2$ | —      | 48      | <0.1    |
| HF  | 95     | <0.1    | <0.1    |

(Numerals in the table are unprocessed rates (%).)

The results show the same tendency recognized in Example 4.

EXAMPLE 6

The same SUS packed tower as Example 1 was filled with a 10 cm high packed bed of molybdenum (granules). The same experiment was conducted with other conditions similarly maintained as in Example 1. The results are shown in Table 6 below.

TABLE 6

|  | 20° C. | 100° C. | 200° C. | 300° C. |
|---|---|---|---|---|
| $F_2$ | 85 | 2 | <0.1 | <0.1 |

(Numerals in the table are unprocessed rates (%).)

The results show that fluorine can be removed sufficiently at elevated temperatures.

EXAMPLE 7

The same SUS packed tower as Example 1 was filled with a 10 cm high packed bed of nickel (granules, 2 to 5 mm in diameter). The same experiment was conducted with other conditions similarly maintained as in Example 1. The results are shown in Table 7 below.

TABLE 7

|  | 20° C. | 200° C. | 300° C. |
|---|---|---|---|
| HF | 87 | <0.1 | <0.1 |

(Numerals in the table are unprocessed rates (%).)

The results show that HF can be removed sufficiently at elevated temperatures.

EXAMPLE 8

The same SUS packed tower as Example 1 was filled with a 10 cm high packed bed of manganese (granules, 2 to 5 mm in diameter). The same experiment was conducted with other conditions similarly maintained as in Example 1. The results are shown in Table 8 below.

TABLE 8

|  | 20° C. | 200° C. | 300° C. |
|---|---|---|---|
| HF | 92 | <0.1 | <0.1 |

(Numerals in the table are unprocessed rates (%).)

The results show that HF can be removed sufficiently at elevated temperatures.

EXAMPLE 9

The same SUS packed tower as Example 1 was filled with a 10 cm high packed bed of tantalum (granules, 2 to 5 mm in diameter). The same experiment was conducted with other conditions similarly maintained as in Example 1. The results are shown in Table 9 below.

TABLE 9

|  | 20° C. | 200° C. | 300° C. |
|---|---|---|---|
| $F_2$ | — | 58 | <0.1 |
| $Cl_2$ | — | — | 3 |
| HF | — | 64 | <0.1 |

(Numerals in the table are unprocessed rates (%).)

The results show that all halogen compound gases can be removed sufficiently at high temperatures.

EXAMPLE 10

The same SUS packed tower as Example 1 was filled with a 10 cm high packed bed of cobalt (granules, 10 mm or smaller in diameter). The same experiment was conducted with other conditions similarly maintained as in Example 1. The results are shown in Table 10 below.

TABLE 10

|  | 20° C. | 200° C. | 300° C. |
|---|---|---|---|
| $Cl_2$ | — | 22 | <0.1 |
| HF | 94 | <0.1 | <0.1 |

(Numerals in the table are unprocessed rates (%).)

The results show that $Cl_2$ is removed at higher temperatures than HF.

The above Examples 1 to 10 cause no corrosion at the outlet of the processed gases.

What is claimed is:

1. A method of treating exhaust gases containing halogen compounds selected from the group consisting of HF, HCl, HBr, $F_2$, $Cl_2$ and $Br_2$, the method comprising bringing the exhaust gases containing the halogen compounds into contact with an agent consisting of at least one metal selected from the group consisting of tin, zirconium, manganese and cobalt.

2. The method as defined in claim 1, wherein the exhaust gases containing halogen compounds are brought into contact with the metal at 20 to 300° C.

* * * * *